Patented Mar. 8, 1949

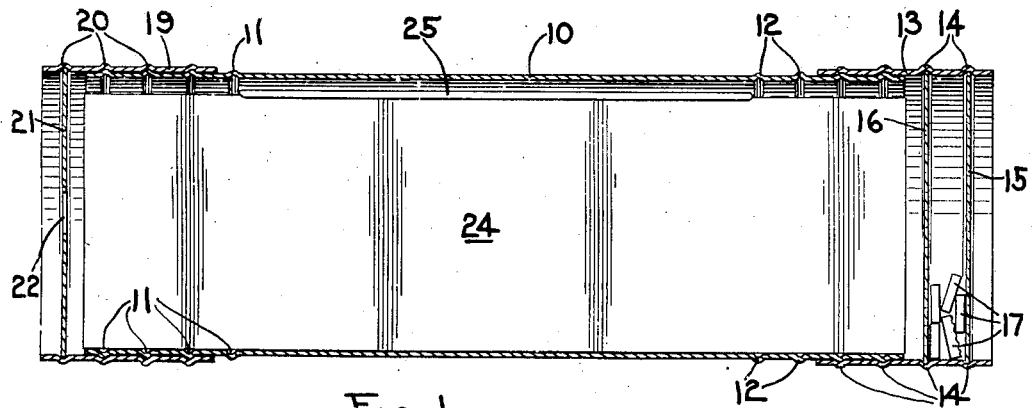

2,464,055

UNITED STATES PATENT OFFICE 2,464,055

KALEIDOSCOPE

Herbert A. Papke, Grand Rapids, Mich.

Application August 4, 1945, Serial No. 608,993

8 Claims. (Cl. 88—15)

This invention relates to kaleidoscopes and more particularly to the novel construction thereof.

The purpose of the present invention is to provide a novel construction for kaleidoscopes which are easy to manufacture and assemble; to provide a cylindrical viewer tube and eyepiece which are formed the same as the ends of the main tube; to provide a viewer tube in which no spacer is necessary to provide the space for the tumblers to be viewed between the transparent lens and the frosted lens; to provide a viewer tube in which the tube does not overhang into the viewing area; to provide simple and effective means for properly locating the mirrors in the main tube.

Illustrative embodiments of the invention are shown in the accompanying drawing, wherein:

Fig. 1 is a vertical longitudinal sectional view of a kaleidoscope made in accordance with the construction of my invention;

Fig. 2 is a vertical longitudinal sectional view of the rotatable viewer unit removed from the main tube;

Fig. 3 is a vertical longitudinal sectional view of outer end of the main tube;

Fig. 4 is a vertical lateral sectional view through the main tube showing one form of means for angularly locating the mirrors in the main tube;

Fig. 5 is a view similar to Fig. 4 but showing another form of locating means; and Fig. 6 is a view similar to Fig. 4 but showing still another form of locating means.

Referring then to the drawings in which like reference numerals refer to like parts throughout the several views, the main tube 10 of plastic, metal or the like which may be molded or extruded, is substantially cylindrical in shape and of convenient length, the ends of which are provided with rolled or pressed annular grooves or crimps 11 and 12 at the inner end and the outer end respectively.

A viewer tube 13 of material similar to the main tube and of cylindrical shape and comparatively shorter in length is provided with annular swedged grooves 14 which, when the kaleidoscope is assembled, certain of the swedged grooves 14 embrace certain of the crimps 11 to hold the viewer rotatably assembled with respect to the main tube.

A frosted lens 15 of plastic, glass or the like, is snapped or otherwise forced into the outer swedged groove of the viewer tube, and a similar transparent lens 16 is snapped or otherwise forced into the next adjacent groove of the viewer tube to thus provide a space between the frosted lens and the transparent lens for tumblers 17 of various colored pieces of glass, plastic or similar material. It is here noted that no appreciable part of the viewer tube overhangs the viewer lenses 15 or 16 thus leaving a free unobstructed viewing area and it will further be noted that no spacer is necessary between the lenses 15 and 16, thus also leaving the viewing area unobstructed.

An eyepiece tube 19 made and formed similar to the viewer tube is formed with the swedged grooves 20 which receive certain of the crimps 11 of the main tube over which they are forced and the opaque disc 21, of plastic, glass or similar material, is snapped or forced into the outer groove thereby providing the central opening 22 through which the duplicated tumblers are viewed.

The grooves 14 and 20 on the inner side of the tubes 13 and 19 respectively may be molded therein leaving the outer surface of the tubes smooth, and the ridges 11 and 12 may be also molded in the main tube leaving the inner surface of the main tube likewise smooth.

Means are provided for holding mirrors 23 and 24 in the relative 30° angular position and this is accomplished by one form of means shown in Fig. 4. In this form, the main tube 10 is formed with two sets of spaced parallel longitudinal ridges 25 and 26 near the upper length of the tube to receive the upper edges of the two mirrors. The lower edges of the mirrors are received in the groove formed by spaced parallel longitudinal ridges 27 along the bottom length of the tube.

Another form of means for holding the mirrors in angular position is shown in Fig. 5. In this form, the bottom edges of the mirrors are received in the same groove formed by the spaced parallel ridges 27 but the upper edges of the mirrors are held apart by the spaced and parallel longitudinal ridges 28 and 29 and are held from moving relatively outwardly by the curvature of the main tube 10.

Still another form of mirror locating means is shown in Fig. 6 in which two parallel ridges 30 and 31 are formed lengthwise and near the upper length of the tube which hold the upper edges of the mirrors at a 30° angle apart. The curvature of the inner side of the main tube holds the upper edges of the mirrors inwardly against the ridges 30 and 31 and the lower edges of the mirrors together along the lower length of the tube.

The ridges as shown in Figs. 4 and 5 are formed by extrusion or molding in which the outer surface of the main tube is smooth whereas in Fig. 6 the ridges are formed by pressing grooves in the outer surface of the main tube forming the ridges on the inner side.

From the foregoing description, it will be seen that the kaleidoscope may be easily manufactured since it is of tubular shape and possibly extruded and that the grooves and crimps of the main tube, viewer tube and the eyepiece tube may be all rolled with the same equipment. With the elimination of the spacer, the kaleidoscope is easy to assemble with the eyepiece tube and the viewer tube since both may be forced over the ends of the main tube with the swedged ridges registering in the swedged grooves and the lenses 15 and 16 and the disc 21 may be simply snapped in place in the groove of their respective tubes.

While but several specific embodiments of the invention have been herein shown and described, it will be understood that certain details of the constructions shown may be altered or omitted without departing from the spirit of the invention as the same is defined in the following claims.

I claim:

1. A kaleidoscope comprising a main tube having a plurality of spaced outwardly extending annular ridges at both ends thereof, an eyepiece having a plurality of spaced grooves complemental to the said ridges and secured thereby to one end of the main tube, a pair of mirrors disposed angularly within the main tube, a viewer tube having a plurality of spaced outwardly extending annular grooves including an outer groove, a frosted lens located in the outer groove, a transparent lens located in an adjacent groove, the annular ridges of the main tube located in other grooves, and tumblers located between the frosted lens and the transparent lens.

2. A kaleidoscope comprising a cylindrical tube having a plurality of spaced outwardly extending annular ridges at both ends thereof, an eyepiece having an annular groove complemental to the said ridges and secured thereby to one end of the tube, a pair of mirrors disposed angularly within the tube, a cylindrical detachable viewer tube the inner diameter of which is a rotatable fit larger than the outer diameter of the main tube and having a plurality of spaced outwardly extending annular grooves including an outer groove at its inner surface complemental to the ridges at the other end of the tube and secured thereby to the tube, a circular frosted lens located in the outer groove, a circular transparent lens located in an adjacent groove, the annular ridges of the tube being located in other annular grooves of the viewer tube, and tumblers located between the frosted lens and the transparent lens.

3. A kaleidoscope comprising a cylindrical tube having a plurality of spaced outwardly extending annular ridges at both ends thereof, an eyepiece having spaced annular grooves complemental to the said ridges and secured thereby to one end of the cylindrical tube, a pair of mirrors disposed angularly within the tube, a detachable cylindrical viewer tube having a plurality of spaced outwardly extending annular grooves including an outer groove, which grooves are complemental to the said ridges at the other end of the tube and secured thereby to the tube, the outer diameter of the ridges of the cylindrical tube being larger than the inner diameter of the viewer tube, a circular frosted lens located in the outer groove, a circular transparent lens located in an adjacent groove, the annular ridge of the main tube being located in other annular grooves of the viewer tube, and tumblers located between the frosted lens and the transparent lens.

4. A kaleidoscope comprising a cylindrical tube having a plurality of spaced outwardly extending annular ridges, an eyepiece secured to the inner end of the cylindrical tube, a pair of mirrors disposed angularly within the tube, a cylindrical viewer tube having a plurality of spaced outwardly extending annular grooves, the outer diameter of the ridges of the cylindrical tube being larger than the inner diameter of the viewer tube, a circular frosted lens having a diameter larger than the inner diameter of the viewer tube located in the outer annular groove of the viewer tube, a circular transparent lens of larger diameter than the inner diameter of the viewer tube located in an adjacent annular groove, the annular ridges of the cylindrical tube being located in other annular ridges of the viewer tube, and tumblers located loosely between the frosted lens and the transparent lens.

5. A kaleidoscope comprising a cylindrical tube having a plurality of spaced parallel longitudinal ridges along its inner surface, an eyepiece secured to the inner end of the tube and having a plurality of spaced outwardly extending ridges, a pair of mirrors the bottom edges of which are located between spaced parallel ridges, the upper edges of which are held in spaced relation by being located between other spaced parallel longitudinal ridges, a cylindrical viewer tube having a plurality of spaced outwardly extending annular grooves at its inner surface, a circular frosted lens located in an outer groove of the viewer tube, a circular transparent lens located in the next adjacent groove, the annular ridges of the cylindrical tube located in other annular grooves of the viewer tube, and tumblers loosely located between the frosted lens and the transparent lens.

6. A kaleidoscope comprising a cylindrical tube provided with a plurality of spaced outwardly extending annular ridges, a pair of mirrors disposed angularly within the tube, a cylindrical viewer tube rotatably mounted on the outer end of the cylindrical tube provided with a frosted lens and a transparent lens secured therein in spaced relation with tumblers loosely located therebetween, a cylindrical eyepiece tube provided with a plurality of spaced outwardly extending annular grooves, a circular disc having a central opening located in the outer annular groove of the eyepiece tube, the annular ridges of the cylindrical tube located in other annular grooves of the eyepiece tube.

7. A kaleidoscope comprising a cylindrical tube provided with a plurality of spaced outwardly extending annular ridges, a pair of mirrors disposed angularly within the tube, a cylindrical viewer tube rotatably mounted on the outer end of the cylindrical tube provided with a frosted lens and a transparent lens in spaced relation with tumblers loosely located therebetween, a cylindrical eyepiece tube provided with a plurality of spaced outwardly extending annular grooves, a circular disc having a central opening therethrough of larger diameter than the inner diameter of the eyepiece tube located in the outer annular groove of the eyepiece tube, the annular ridges of the cylindrical tube located in other annular grooves of the eyepiece tube.

8. A kaleidoscope comprising a cylindrical tube provided at both ends with a plurality of spaced outwardly extending annular ridges, a cylindrical eyepiece provided with a plurality of spaced outwardly extending annular grooves, a circular disc having a central opening located in an outer groove, annular ridges at one end of the cylindrical tube located in other annular grooves of the eyepiece tube, a cylindrical viewer tube provided with a plurality of spaced outwardly extending annular grooves, a frosted lens located in an outer groove of the viewer tube, a transparent lens located in an adjacent groove, annular ridges at the other end of the cylindrical tube located in other annular grooves of the viewer tube, tumblers loosely located between the frosted lens and the transparent lens, and mirrors located angularly within the cylindrical tube.

HERBERT A. PAPKE.

REFERENCES CITED

The following references are of record in the file of this patent:

UNITED STATES PATENTS

| Number | Name | Date |
|---|---|---|
| 151,005 | Bush | May 19, 1874 |
| 630,652 | Buck | Aug. 8, 1899 |
| 1,078,008 | Stough | Nov. 11, 1913 |
| 1,290,078 | Cappa | Jan. 7, 1919 |
| 1,294,967 | Stabla | Feb. 18, 1919 |
| 1,414,469 | House | May 2, 1922 |
| 2,423,371 | Carranza | July 1, 1947 |

FOREIGN PATENTS

| Number | Country | Date |
|---|---|---|
| 451,153 | Great Britain | July 30, 1936 |